United States Patent
Hibi et al.

[11] Patent Number: 6,091,520
[45] Date of Patent: Jul. 18, 2000

[54] COLOR IMAGE FORMING DEVICE

[75] Inventors: Yoshiharu Hibi; Atsushi Kitagawara; Toru Misaizu; Toshio Yamazaki, all of Ebina; Hitoshi Ogatsu, Ashigarakami-gun, all of Japan

[73] Assignee: Fuji Xerox Co., Ltd., Tokyo, Japan

[21] Appl. No.: 09/006,202

[22] Filed: Jan. 13, 1998

[30] Foreign Application Priority Data

Jan. 14, 1997 [JP] Japan .................................. 9-004952

[51] Int. Cl.⁷ .................................. H04N 1/40
[52] U.S. Cl. .................................. 358/530
[58] Field of Search .................................. 358/500, 501, 358/502, 503, 515, 516, 517, 519, 521, 522, 527, 530, 523; 382/162, 163, 168

[56] References Cited

U.S. PATENT DOCUMENTS 4,774,602 9/1988 Mikame .................................. 360/60
5,481,378 1/1996 Sugano et al. .................................. 358/501

FOREIGN PATENT DOCUMENTS 60-19359  1/1985  Japan .................................. H04N 1/40
6-69211   3/1994  Japan .................................. H01L 23/29
6-100861  4/1994  Japan .................................. G06F 1/13
7-276711  10/1995 Japan .................................. B41J 2/525

Primary Examiner—Jerome Grant, II
Attorney, Agent, or Firm—Oliff & Berridge, PLC

[57] ABSTRACT

A color image forming device produces a good image form, superior in color and gradation reproduction, and little over-enhancement in sharpness during generation duplicating. The device has an image processing parameter storage unit that stores parameters for processing which correspond to original document modes in respective processing blocks. An image processing parameter detector detects the original document mode, and provides the mode to the respective components as an original document mode directive TAG. When generation duplicating is designated, the generation duplicating mode corresponding to the set original document mode is set, and various parameter settings are indicated corresponding to the set generation duplicating mode in the image processing parameter storage unit. By such, the operation in each image processing module is converted to the set generation duplicating mode.

12 Claims, 8 Drawing Sheets

| MODE SETTING | INPUT GRADATION CORRECTOR | FIRST COLOR SIGNAL CONVERTER | SECOND COLOR SIGNAL CONVERTER | SPATIAL FILTER PROCESSOR | OUTPUT GRADATION CORRECTOR | OUTPUT SCREEN CONVERTER |
|---|---|---|---|---|---|---|
| PRINTED PHOTOGRAPH MODE | TYPE 1 | TYPE 1 | TYPE 1 | TYPE 1 | TYPE 1 | TYPE 1 |
| SENSITIZED PAPER PHOTOGRAPH MODE | TYPE 2 | TYPE 2 | TYPE 2 | TYPE 2 | TYPE 2 | TYPE 1 |
| CHARACTER MODE | TYPE 1 | TYPE 1 | TYPE 3 | TYPE 3 | TYPE 3 | TYPE 2 |
| MAP MODE | TYPE 3 | TYPE 3 | TYPE 4 | TYPE 4 | TYPE 4 | TYPE 2 |
| PRINT MODE | - | - | - | - | - | TYPE 2 |
| PRINTED PHOTOGRAPH G MODE | TYPE 5 | TYPE 5 | TYPE 5 | TYPE 5 | TYPE 5 | TYPE 1 |
| SENSITIZED PAPER PHOTOGRAPH G MODE | TYPE 5 | TYPE 5 | TYPE 5 | TYPE 6 | TYPE 5 | TYPE 1 |
| CHARACTER G MODE | TYPE 5 | TYPE 5 | TYPE 6 | TYPE 7 | TYPE 6 | TYPE 2 |
| MAP G MODE | TYPE 5 | TYPE 5 | TYPE 7 | TYPE 8 | TYPE 7 | TYPE 2 |
| PRINT G MODE | TYPE 5 | TYPE 5 | TYPE 7 | TYPE 8 | TYPE 7 | TYPE 2 |

| MODE SETTING | INPUT GRADATION CORRECTOR | FIRST COLOR SIGNAL CONVERTER | SECOND COLOR SIGNAL CONVERTER | SPATIAL FILTER PROCESSOR | OUTPUT GRADATION CORRECTOR | OUTPUT SCREEN CONVERTER |
|---|---|---|---|---|---|---|
| PRINTED PHOTOGRAPH MODE | TYPE 1 | TYPE 1 | TYPE 1 | TYPE 1 | TYPE 1 | TYPE 1 |
| SENSITIZED PAPER PHOTOGRAPH MODE | TYPE 2 | TYPE 2 | TYPE 2 | TYPE 2 | TYPE 2 | TYPE 1 |
| CHARACTER MODE | TYPE 1 | TYPE 1 | TYPE 3 | TYPE 3 | TYPE 3 | TYPE 2 |
| MAP MODE | TYPE 3 | TYPE 3 | TYPE 4 | TYPE 4 | TYPE 4 | TYPE 2 |
| PRINT MODE | — | — | — | — | — | TYPE 2 |
| PRINTED PHOTOGRAPH G MODE | TYPE 5 | TYPE 5 | TYPE 5 | TYPE 5 | TYPE 5 | TYPE 1 |
| SENSITIZED PAPER PHOTOGRAPH G MODE | TYPE 5 | TYPE 5 | TYPE 5 | TYPE 6 | TYPE 5 | TYPE 1 |
| CHARACTER G MODE | TYPE 5 | TYPE 5 | TYPE 6 | TYPE 7 | TYPE 6 | TYPE 2 |
| MAP G MODE | TYPE 5 | TYPE 5 | TYPE 7 | TYPE 8 | TYPE 7 | TYPE 2 |
| PRINT G MODE | TYPE 5 | TYPE 5 | TYPE 7 | TYPE 8 | TYPE 7 | TYPE 2 |

FIG.3

COLOR IMAGE FORMING DEVICE

BACKGROUND OF THE INVENTION

1. Field of Invention

This invention relates to a color image forming device for a color copier, a color facsimile or the like, which scans a color image, performs image processing on the obtained color separation signal and forms a color image.

2. Description of Related Art

Recently, the number of color print original documents have increased because of the widespread use of personal computers that deal with color printers and color images and which facilitate the creation of color images for the general user. In addition, the use of color image forming devices in color copiers and the like have become widespread, and not only the duplication of color printed original documents, color picture original documents and the like, but the re-duplication of duplicate documents by color copiers has also increased.

Many of the image processing parameters which are set for duplication comply with and provide for an assumed type of original manuscript in order to improve the color reproducibility and the gradation reproducibility. For example, menus are provided for a "printed photograph", which assumes a printed original document printed by using a general ink set, a "sensitized paper photograph", which assumes a photographic original document, and the like. When a reproduction of the duplicate copy is desired that is better than the duplicate, by selecting the type of original document, it is possible to perform correction of set gradation characteristics and color characteristics.

In the case of a "sensitized paper photograph", for example, where the reproduction characteristic is continuous gradation and not area gradation such as dotted gradation screen characteristics such as sharpness, and a natural filter characteristic can be selected because there is a degree of freedom in the screen design. In addition, it is possible to form color conversion characteristics matching the color separation characteristics of the image input device and the color material of the sensitized paper.

Meanwhile, in the case of a "printed photograph" original document, a reproduction characteristic is area gradation by a dotted screen, so the spatial filter and the screen characteristics are generally adjusted to avoid the moire effect from the interference between the sampling frequency during reading and the output reproduction screen.

The technology which changes the image processing parameters according to the type of original document are taken from prior art: for example, in Japanese Laid-Open Patent Publication No. Hei 7-276711, a color correction table is selected according to the input original document. In addition, in Japanese Patent Publication No. Hei 6-69211, revised density data of the density conversion table is re-written according to the image classification. Furthermore, a method of acquiring the image processing parameters corresponding to the original document, for example as recorded in Japanese Laid-Open Patent Publication No. Sho 60-19359 and Japanese Patent Publication No. Hei 6-100861, a set pattern, original document and the like are output one time, read and then determined by contrasting it with the original pattern and original document.

When an output original document from a certain color printer is copied again as the original document (hereafter called generation duplicate), in addition to the characteristics which should be considered as in the case of a "printed photograph" original document, it is necessary to attain in advance the mode reproduction characteristics which were used when processing and outputting the prior generation. This is because, in order to make a true reproduction of the original document, generally, the first generation copy aims for color reproduction and gradation reproduction which are completely identical to the original document. However, because of limitations in input device and output device characteristics, image processing structure and the like, a reproduction completely identical to a common original document is not possible. Accordingly, for an original document, there are numerous cases in which reproduction is carried out after making considerations such as slightly intensifying color reproduction and slightly intensified emphasis of sharpness. Also, because of differences in characteristics such as the original document paper and the copy paper, minute control is necessary for a high-lite reproduction condition. For various original document modes, such as a character original document mode and a map original document mode, for example, in a mode corresponding to a special original document, the appearance of the document copy is considered more than a true reproduction, and cases exist in which characteristics of sharpness, gradation, and the like are set in a higher shade of emphasis than the original document. If processing in this type of mode continues, the emphasized parts will become more emphasized, while the lighter parts become even lighter, resulting in a poor condition from image quality of exceedingly unbalanced characteristics.

SUMMARY OF THE INVENTION

This invention provides a color image forming device for producing a good image superior in color reproduction and gradation reproduction, and which has little over-intensifying of sharpness and the like, in generation duplicating.

The invention is a color image forming device that has a detector that detects whether the item that is to be copied is a duplicate original document or a print of an original manuscript. The color image forming device stores parameters that are specific to processing of an input document that is either a duplicate original document or a print of an original manuscript. Image processing is performed in the color image forming device based upon the copy condition that the item to be copied is a duplicate original document or a print condition that the input document is a print not an original manuscript using the specified parameters.

BRIEF DESCRIPTION OF THE DRAWINGS

FIG. 3 shows a table of image processing parameters corresponding to each original document mode stored in an image processing parameter storage unit in accordance with the first embodiment of the present invention;

DETAILED DESCRIPTION OF PREFERRED EMBODIMENTS

Figure 1:
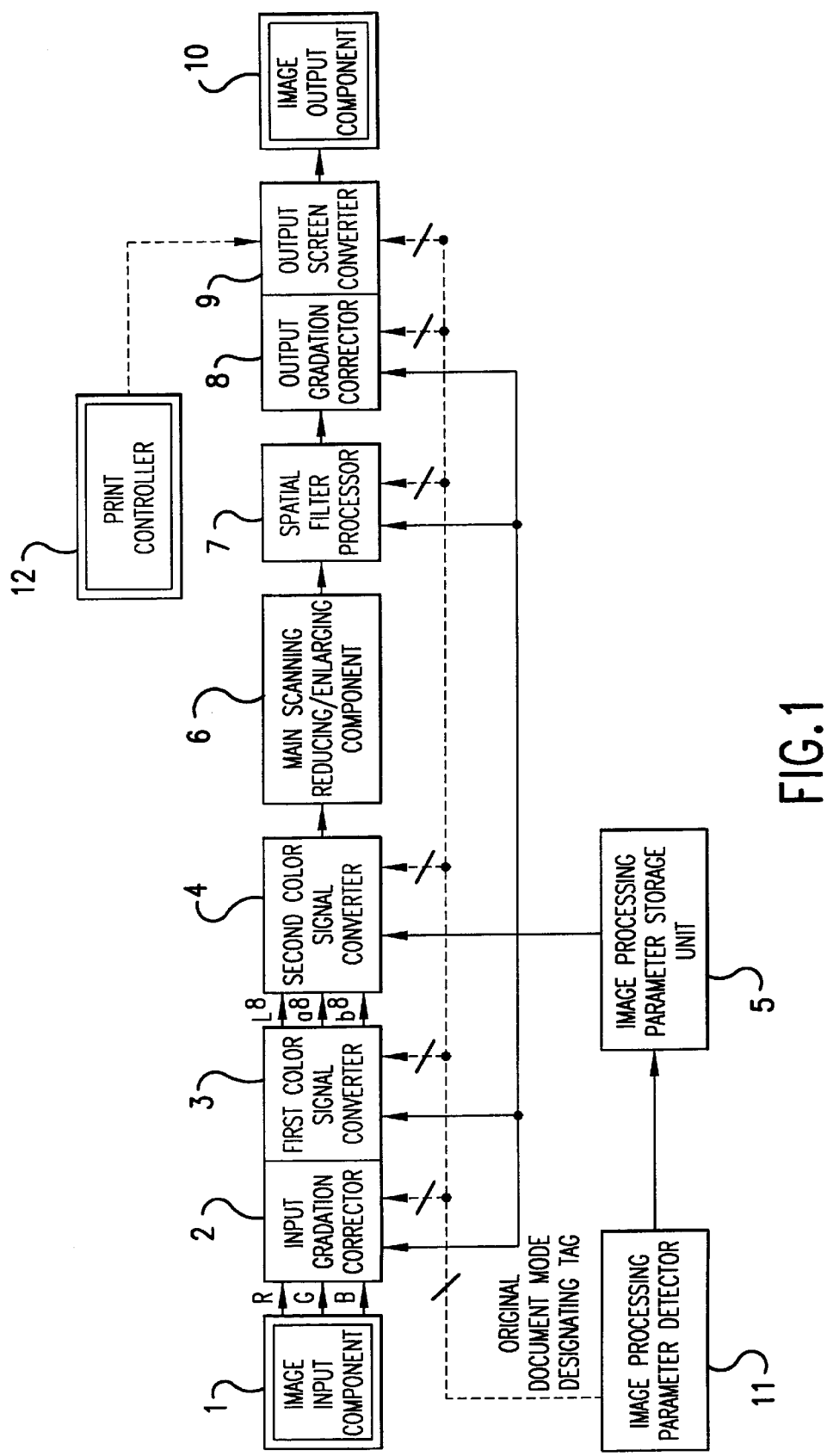
FIG. 1 is a block diagram of a first embodiment of the color image forming device of the present invention.

FIG. 1 shows a schematic diagram of one embodiment of the color image forming device of the present invention. In FIG. 1, 1 is an image input component, 2 is an input gradation corrector, 3 is a first color signal converter, 4 is a second color signal converter, 5 is an image processing parameter storage unit, 6 is a main scanning reducing/enlarging component, 7 is a spatial filter processor, 8 is an output gradation corrector, 9 is an output screen converter, 10 is an image output component, 11 is an image processing parameter detector, and 12 is a print controller.

The image input component 1 sends out the image of the original document at a set pixel density in pixel sequence, for example, the image is resolved into color signals of 8 bits each for R, G and B to input to the gradation corrector 2. In input gradation corrector 2, the gradation conversion dependent on the output of image input component 1 is performed and transmitted to the first color signal converter 3. In the first color signal converter 3, RGB color signals are converted to color signals of 8 bits for each L*, a* and b*, and transmitted to the second color signal converter 4.

In the second color signal converter 4, the L*, a* and b* signals are color converted to KCMY signals by matching the amount of GCR (Grey Component Replacement) in consideration of the color characteristics of the device used for output and the black color (K) print. The image output component 10 uses a recording method that sequentially records each color of K, Y, M and C, aligns the reproduction cycle of each color, color converts the L*, a* and b* signals to K, Y, M and C in the respective color order, and transmits them.

The signals of each color K, Y, M and C output from the second color signal converter 4 are converted to a specified magnification in the main scanning direction by the main scanning reducing/enlarging component 6, and then transmitted to the spatial filter processor 7. The enlargement/reduction in the sub-scanning direction can be performed by changing the scanning speed in the sub-scanning direction of the image input device 1. Afterwards, for example, sharpening and noise reduction processing and the like are performed by the spatial filter processor 7. Gradation conversion corresponding to the image output component 10 is carried out in the output gradation corrector 8. An output screen is selected and used by the output screen converter 9 in conformance with the original document mode signal. Next, the output image is composed, and the image is formed by image output component 10.

Image processing parameter detector 11 detects the set original document mode. At this time, a detection is made to determine whether it is a generation duplicate or not. The detected original document mode is supplied as an original document mode designating TAG to each component. In order to perform processing in each processing block, the image processing parameter storage unit 5 stores reference parameters, and loads the parameters in each processing block, as necessary, in compliance with the original document mode that was detected by the image processing parameter detector 11.

Print controller 12 is equipped with a function for outputting an image from the image output component 10 upon receiving a print command from another machine, for example, a computer or the like connected to the network. Through this function, the image output component 10 of a color copier can also be used as a color printer.

Figure 2:
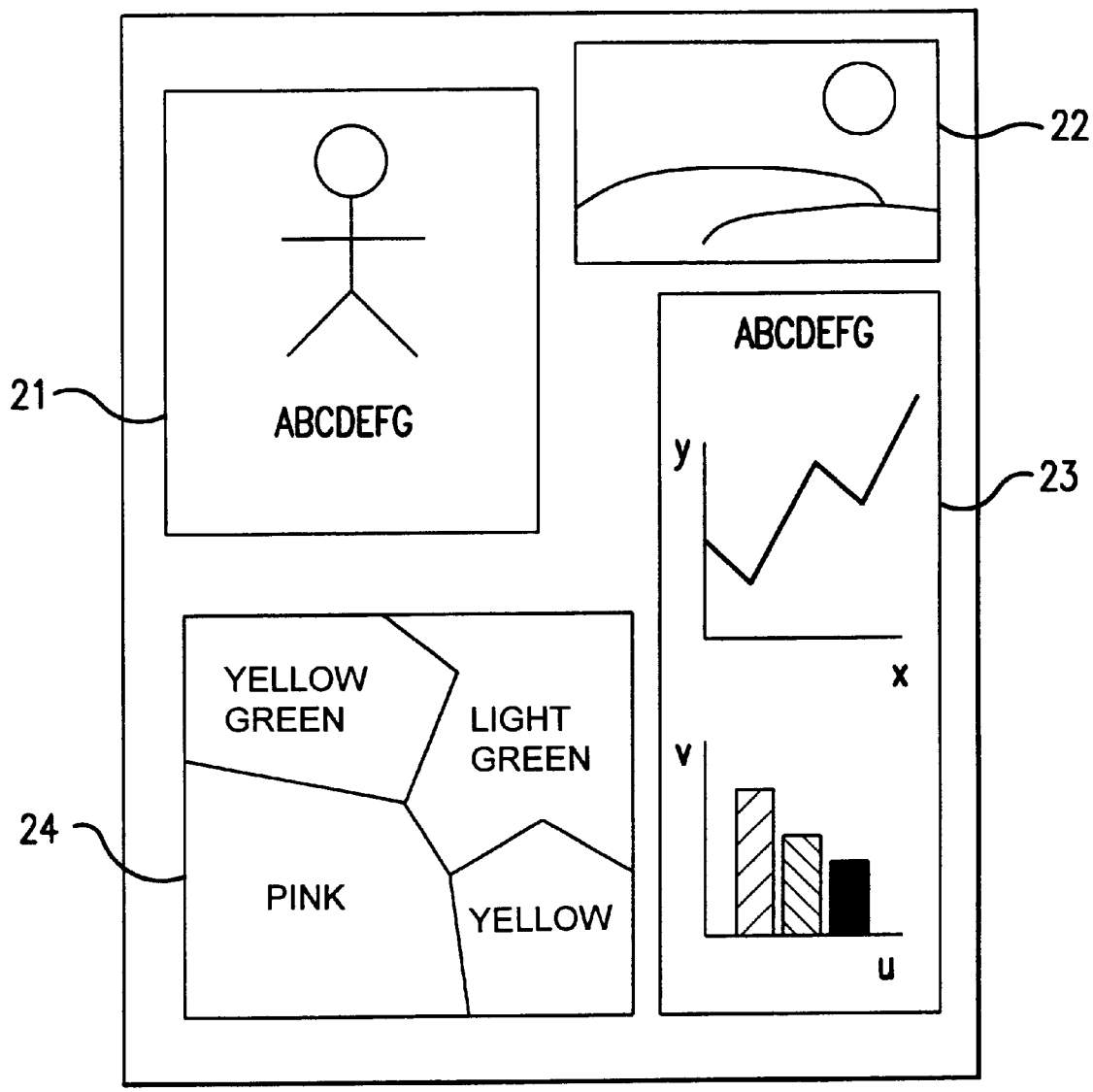
FIG. 2 shows one example of an original document mode.

FIG. 2 shows an example of an original document mode. In order to perform optimal reproduction according to the type of original document, the four modes of printed photograph mode, sensitized paper photograph mode, character mode, and map mode are provided. In the original document shown in FIG. 2, 21 is the printed photograph mode area, 22 is the sensitized paper photograph mode area, 23 is the character mode area, and 24 is the map mode area. These areas and the original document modes can be instructed, for example, by an editing designator that is not shown. These original document mode instructions and the like may come, for example, from an editor pad or a host computer. When no particular mode selection is intended, a pre-set printed photograph mode is appropriate. That is, in the original document shown in FIG. 2, in the area where the mode selection was not made, the printed photograph mode is appropriate. In the example shown in FIG. 2, each mode selection is performed using rectangular areas, but the invention is not limited to such a shape. Mode selection may also be performed for round areas and any other optionally shaped areas.

The printed photograph mode is used when copying a common printed subject. As described above, for a common color printed subject, the density of each ink is adjusted according to the area gradation for the dotted screen and for the various colors that are being formed. Processing is necessary in order to prevent the moire effect from occurring due to the interference between the sampling frequency during reading, the spatial frequency in the subsequent processing, and the screen characteristics and the like during output. In addition, this is a mode in which color reproduction quality and gradation reproduction quality are emphasized.

The sensitized paper photograph mode is a mode which assumes a sensitized paper original document and corresponds to common photoprint characteristics. In the sensitized paper original document, the image is of continuous gradation, and is not area gradation that is dotted as in a printed subject, so a natural reproduction of the image is possible. This mode is required for a true reproduction of the original document.

The character mode is an ideal mode for recording characters, business graphics and the like. In this original document mode, a dark and clear reproduction is more desirable than a true color reproduction.

The map mode is an effective mode for maps and the like in which there are many instances in which one part or the entire document is printed in a specific color. Instead of standard printing, in which the four colors of ink CMYK are used as said specific colors in layered printing. This printing method superimposes only a number of specific colors and uses them as one color of ink. This is accomplished by a direct mixture, a mixture of types of coloring agents, a mixture of different content ratios, or simply by a mixture of coloring agents of the color that one wants to reproduce such as red, green, gray or pale pink. A characteristic of this type of ink is that it allows an even larger color reproduction scope (color area) than a process color. Accordingly, color area compression is emphasized, and it is necessary to perform color area compression such that similar colors are sufficiently distinguishable. Particularly, for a bright color of a higher chroma, instead of using conventional color area compression which maintains the luminosity and keeps the original hue, which, when the color to be reproduced is of a red color system, there is a tendency to prefer a color which has fewer un-used colors such as cyan. In other words, in the map mode, if there is color outside of the color area, the color is reproduced giving a vivid impression, or if colors of the same color group are divided, color identification does not deteriorate. In addition, the map mode places importance on high readability of small or fine characters.

As shown in FIG. 2, in order to respond to an operation specifying a plurality of original document types on the same page, each component must be structured so that parameters can be switched for each processing pixel according to the original document mode designating TAG signal. For example, the input gradation corrector 2 is formed by a general one dimensional look-up table. For an 8-bit input signal, table data of 256 units are prepared for each original document mode, and the address is switched based on the original document mode designating TAG signal. In this manner, in various image processing modules, it is possible to designate a plurality of original document types on the same page of the original document by making the structure such that parameters can be switched for each processing pixel according to the original document mode designating TAG signal.

FIG. 3 is a table of example image processing parameters corresponding to each original document mode stored in the image processing parameter storage unit 5. Image processing parameter storage unit 5 stores the image processing parameters, such as are shown in FIG. 3, for each image mode. The columns show the components that perform the image processing shown in FIG. 1 (hereafter, referred to as "image processing blocks"), and the rows show the original document modes. The designating parameter set used in the respective image processing blocks for each original document mode is shown. The "Type N" (N=1–8) in the columns shows the different parameter types in each image processing block. For example, it should be noted that the "Type 1" in the input gradation corrector column and the "Type 1" in the first color signal converter column do not show the same parameter, but show the appropriate parameter in the original document mode of every image processing block.

Here, original document modes are shown in which "G" is associated with each mode. For example, the character G mode shows a parameter set that is set for an original document duplicated in the character mode, or a generation duplicate of an original document. Furthermore, the print modes show the case in which this device is used as a color printer. The print G mode is a mode which, assumes a situation in which generation duplicating is performed on a print original document that is output by a color printer, and is considered to be one type of generation duplicating.

The following explains a specific example relating to the types set in each mode and each image processing block using FIGS. 4–7. FIG. 4 and FIG. 6 are conceptual diagrams explaining the spatial filter characteristics. The vertical axis indicates MTF (Modulating Transfer Function), and the horizontal axis indicates the number of black and white pattern signals arranged per 1 mm (line pair=1p), and shows the degree of width increase in the input spatial frequency number. When the MTF gain is higher than 1, it shows an enhancement of the signal component of the frequency area, and when less than 1, it shows the weakening of the signal component of the frequency area. Strictly speaking, the MTF is measured in a two-dimensional direction, but it is simplified for the explanation. In addition, FIGS. 5 and 7 are conceptual diagrams explaining the gradation characteristics. For example, the output signal gradation corresponding to the input signal appropriate for the brightness of the gray scale chart using a flat density patch is shown. When the inclination is greater than 45 degrees, a reproduction darker than the input signal is shown.

Figure 4A:
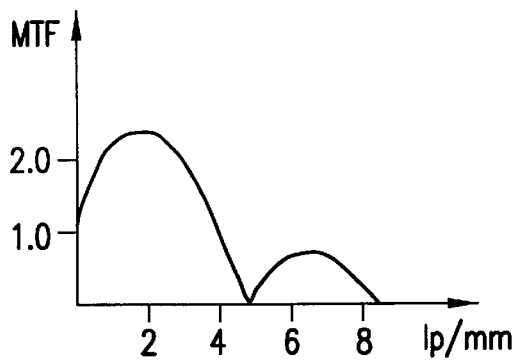
FIGS. 4A–4D are diagrams of the spatial filter characteristics of the first embodiment of the present invention.
Figure 5A:
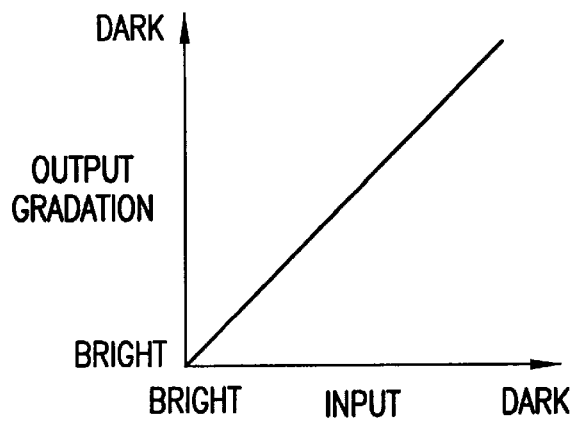
FIGS. 5A–5C are diagrams of the gradation characteristics of the first embodiment of the present invention.

First, the printed photograph mode will be explained. The printed photograph mode, as described above, is used when copying a common printed document. For an original document printed using general art paper and process ink, Type 1 is set in the input gradation corrector 2 and the first color signal converter 3 so that conversion to standard L* a* b* color spatial signals is performed according to the characteristics of image input component 1. In the second color signal converter 4, the grid data of Type 1 is set as an aim for true reproduction. In addition, spatial filter processor 7 has a screen line number of commonly printed documents, and a Type 1 parameter is set which does not cause Moire interference to occur in lines 133–175. Therefore, as shown in FIG. 4A, a parameter that falls within a specific frequency range, around 5 p/mm, is set as the spatial filter characteristic. Type 1, which aims for true tone reproduction, is also set in output gradation corrector 8. Output screen converter 9 selects a Type 1 screen, which has a superior gradation characteristic. Gradation reproducibility via the system is shown in FIG. 5A. As in this graph, for the most part, linear reproducibility is used in the input gradation.

Figure 4B:
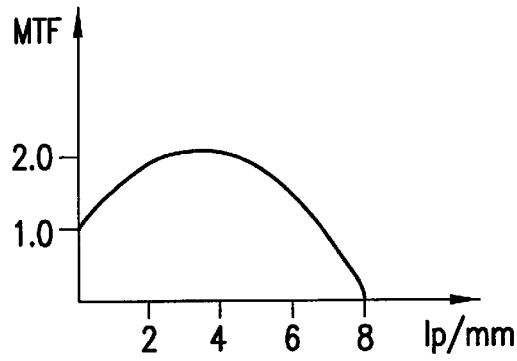

Next, the sensitized paper photograph mode is described. The sensitized paper photograph mode, as mentioned above, assumes a sensitized paper photograph original. For paper and color material characteristics of the general photographic print, Type 2 is set in input gradation corrector 2 and first color signal converter 3 so that conversion to standard L* a* b* color spacing signals is performed according to the characteristics of the image input component 1. In the second color signal converter 4 and the output gradation corrector 8, as with Type 1, the aim is a true reproduction. However, a Type 2 parameter is set which considers the differences between sensitized paper and the color reproduction area, and also considers the mapping method for color outside the color reproduction area. Moreover, in the spatial filter processor 7, it is advisable to set a Type 2 of filter characteristic indifferent to interference from the original document screen. For example, as shown in FIG. 4B, the emphasis is especially on a good balance and not on raised peak gains. Additionally, for the output screen converter 9, a Type 1 screen is selected which is superior in the gradation characteristic. The gradation reproducibility, through the system, as shown in FIG. 5A, is an approximate linear reproduction of the input gradation.

Figure 4C:
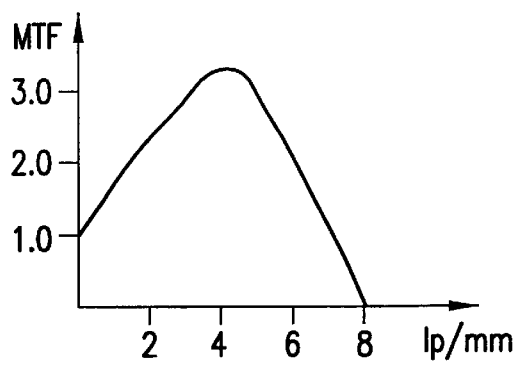
Figure 5B:
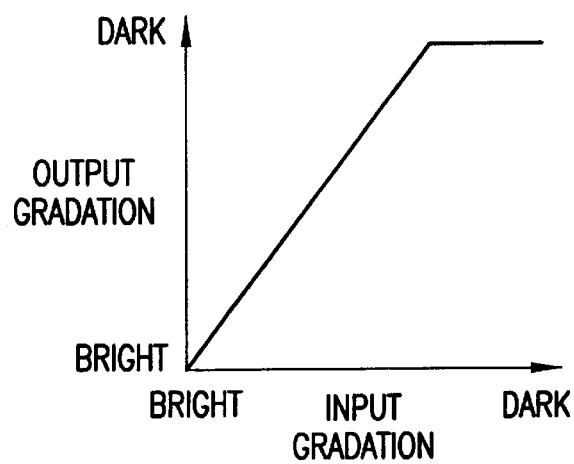

Next, the character mode is explained. The character mode, is a mode which considers a clear reproduction of the reproduced image for business original documents such as colored graphs and patterns, and original documents centered on characters as mentioned above. The color conversion in input gradation corrector 2 and in the first color signal converter 3 assumes, for example, a printed photograph original document, and in the same manner as Type 1, sets a Type 3 parameter which raises the contrast in the second color signal converter 4 and in output gradation corrector 8. In the spatial filter processor 7, line drawing is the focus, so filter characteristic Type 3 is set which somewhat enhances characters, fine lines and black characters so that they will be more clearly reproduced. For example, as shown in FIG. 4C, as the peak approaches a somewhat high frequency, the gain is set higher as well. For the output screen converter 9, a Type 2 screen is selected which has a superior degree of resolution characteristic. The gradation reproducibility through the system, as shown in FIG. 5B, is reproduced in higher contrast to the input gradation.

Figure 4D:
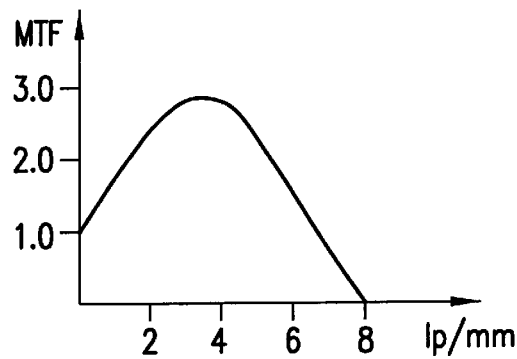
Figure 5C:
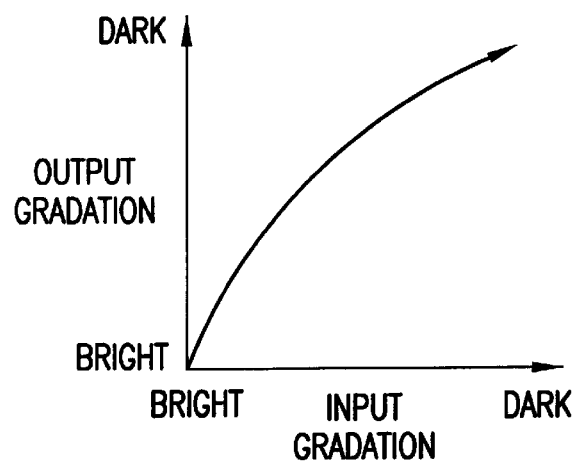

Next, the map mode is explained. The map mode, as mentioned above, is a mode which considers the facility to distinguish special colors and matching pale colors in reproductions for map original documents of colors divided into pale colors and special colors. For color conversion in input gradation corrector 2 and first color signal converter 3, a Type 3 parameter is set according to the characteristics of image input component 1 which enhances color contrast so that the colors are more easily distinguishable for special color ink and the like. The second color signal converter 4 and output gradation corrector 8 consider in particular the reproduction and the like of special colors in particular which exceed the output color reproduction area, and set a Type 4 parameter which considers the mapping of color outside the color reproduction area. In addition, a Type 4 filter characteristic, which reliably performs line reproduction for thin lines, contour lines, and the like is set in the spatial filter processor 7. For example, as shown in FIG. 4D, there is not as much gain characteristic as in FIG. 4C, but high frequency is enhanced. The output screen converter 9 selects a Type 2 screen which has a superior degree of resolution characteristic. As for the gradation reproducibility through the system, reproduction is such that the bright portion contrast is higher than the input gradation as shown in FIG. 5C.

Next, the print mode is explained. In relation to printer output, it is assumed that various processing for output is performed within the print controller 12. In the output screen converter 9, Type 2 is selected, which has a superior degree of resolution characteristic and then print-out is performed.

Next, generation duplicating is considered, and a specific example relating to each type of original document mode is explained. In modes that consider generation duplicating, by supposing that the original document is duplicated on the same machine, it can be assumed that the reprint paper, ink and toner are already established. Accordingly, color conversion to the L* a* b* color space signals based on the color characteristic relation to image input component 1 has the advantage of not needing to increase the type of parameters as compared to a mode not assuming this generation duplicating. For example, in the sensitized paper photograph mode and the map mode, special color ink and the like and mapping of color other than the reproduced colors of image output component 10 are considered. However, during generation duplicating, the color reproduction area of the original document itself is basically equivalent to the color reproduction area of the image output component 10, so it is not especially necessary to consider the mapping parameter of colors other than the reproduced colors. Accordingly, for example, for the characteristics of input gradation corrector 2 and first color signal converter 3 during generation duplicating described hereafter, it is acceptable to jointly use the Type 5 parameter which considers the characteristics described above. Furthermore, even in regard to the generation duplicating original document screen, it is basically becoming unnecessary to broadly correspond. For example, in the image output component 10 of this specific example, it is acceptable to consider only two types of screen characteristics, because only two types of screens are used. The operation during generation duplicating in each original document mode is explained under this type of consideration.

Figure 6A:
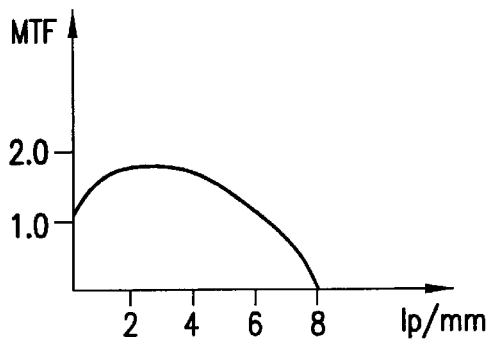
FIGS. 6A–6D are conceptual diagrams of the duplicate spatial filter characteristics of the first embodiment of the present invention.
Figure 6B:
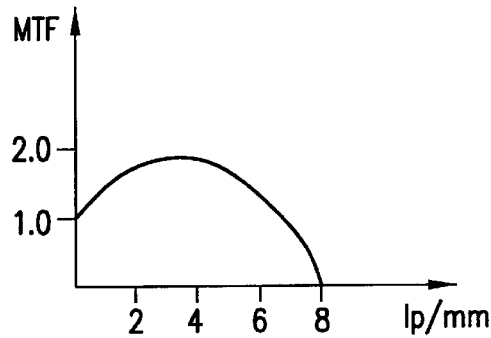
Figure 7A:
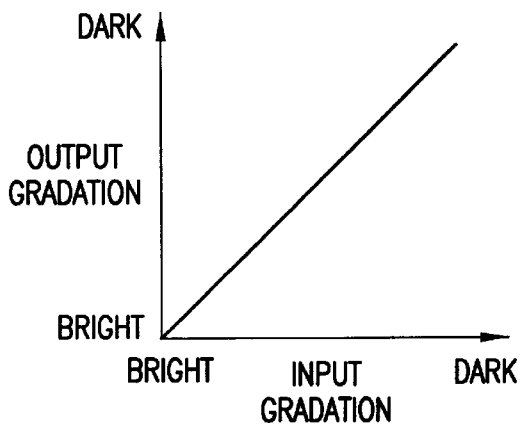
FIGS. 7A–7B are conceptual diagrams of the duplicate gradation characteristics of the first embodiment of the present invention.

First of all, the printed photograph G mode is explained. This printed photograph G mode is used when performing generation duplicating for an original document duplicated in the printed photograph mode. At such time, Type 5 is set in the second color signal converter 4 and output gradation corrector 8, which basically aims for true reproduction of the input color within the color reproduction area. In addition, a Type 5 filter characteristic, which considers a Type 1 screen used during production of the duplicate original document, and a Type 1 filter characteristic of spatial filter processor 7 that is used in the printed photograph mode is set in spatial filter processor 7. For example, for the spatial filter characteristic, as shown in FIG. 6A, a parameter which weakens the emphasis of the peak portion of the gain in FIG. 4A is set. A Type 5, which aims for true tone reproduction, is set in output gradation correction component 8. Output screen converter 9 selects a Type 1 screen that is superior in gradation characteristic. The gradation reproducibility through the system, shown in FIG. 7A, is an approximate linear reproduction of the input gradation.

Next, the sensitized paper photograph G mode is explained. This mode basically corresponds to the printed photograph G mode. However, a Type 6 filter characteristic, which considers the Type 1 filter characteristic of spatial filter processor 7 used in the printed photograph mode in the Type 1 screen, is set in the spatial filter processor 7. For example, as a spatial filter characteristic, as shown in FIG. 6A, a parameter is set which weakens the emphasis of the peak portion of the gain in FIG. 4B. A Type 5, which aims for true tone reproduction, is set in the output gradation corrector 8. For output screen converter 9, a Type 1 screen is selected which is superior in the gradation characteristic. Gradation reproducibility, through the system, as shown in FIG. 7A, is an approximate linear reproduction of the input gradation.

Figure 6C:
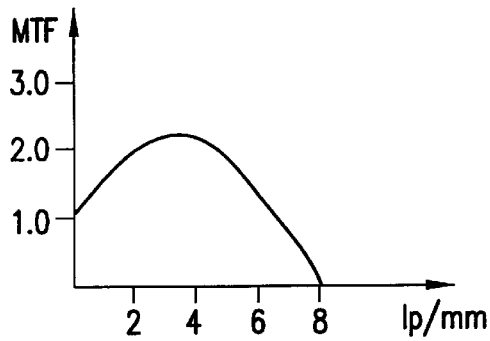
Figure 7B:
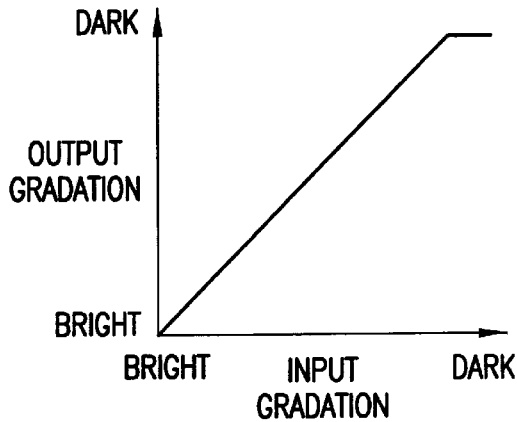

Next, character G mode is explained. The character G mode is used when performing generation duplicating for an original document duplicated in the character mode. A Type 6 parameter is set in the second color signal converter 4 and the output gradation corrector 8, which slightly increases the contrast. In spatial filter processor 7, a line drawing is the focus, so a Type 7 having a slightly strengthened filter characteristic is set. However, since enhancement processing was previously performed during prior reproductions, a decreased degree of enhancement is set. For example, as shown in FIG. 6C, the peak approaches a low frequency, and the gain is set low. Output screen converter 9 selects a Type 2 screen which has a superior degree of resolution characteristic. The gradation reproducibility through the system, as shown in FIG. 7B, is a reproduction of slightly higher contrast than the input gradation.

Figure 6D:
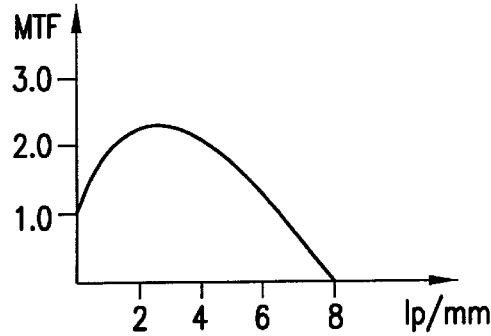

Next, map G mode is explained. During generation duplicating for an original document duplicated in map mode, a Type 7, which basically aims for true reproduction of the input color within the color reproduction area, is set in the second color signal converter 4 and in the output gradation corrector 8. Here, the screen is different from the printed photograph mode and the sensitized paper photograph mode, so the Type is different, but the aim is basically the same. Since the enhancement processing is previously performed during prior reproduction, a Type 8 filter characteristic, which reduces the degree of enhancement, is set in spatial filter processor 7. For example, as shown in FIG. 6D, the peak approaches a lower frequency, and the gain is set lower. Output screen converter 9 selects a Type 2 screen which has a superior degree of resolution characteristic. The gradation reproducibility through the system, as shown in FIG. 7A, is a linear reproduction of the input gradation.

Lastly, print G mode is explained. In relation to the original document output by a printer, processing other than screen processing in the print mode is not stipulated, so here, for example, the print G mode is set in the same manner as setting is performed for the map G mode.

As described above, during generation duplicating, even better image quality can be achieved by switching the processing or the set parameters according to the mode in which the original document is duplicated. For certain, the type of mode for the original document and the setting contents of the parameter are not limited to the above mentioned example. It is possible to increase or decrease the number of original modes, or change to other original modes. For example, modes can be added that assume the type of output device, such as an ink jet original mode, a thermal copy original document, or the like, and for sensitized paper photographs, original modes classified into a finer scope can be added which consider the difference of the color reproducibility of various manufacturers. Additionally, in the parameter setting contents, of which one example is shown in FIG. 3, various settings corresponding to the characteristics of these setting contents are possible.

In relation to the use of the image processing module, a structure other than that shown in FIG. 1 is acceptable, and even if applied to various already known image processing modules, as long as it does not differ from the aim of the present invention. For example, character photograph separation processing and the like which discerns characters, line drawing portions and photograph portions within the original document are often used, and the structure may be made such that the parameters of this invention, which consider the characteristics during generation duplicating and processing, can be set as the parameters. Furthermore, it is also possible to recognize a white area in the original document and apply this invention to sub-correction processing and the like which corrects the signal. In such a case, for example, if the white (paper) characteristic of the original document is previously divided, the sub amount can be set in advance.

Figure 8:
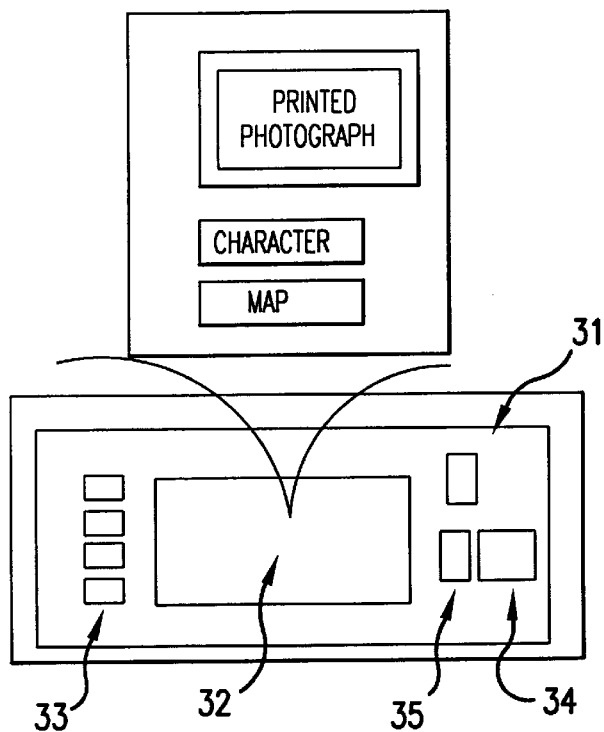
FIG. 8 shows one embodiment of an operation panel of the present invention.

Next, a method of detecting a specific type of original document in the image processing parameter detector 11 is explained. During duplication or printing, duplication is performed by one type of original document mode within one page. FIG. 8 shows one example of the operation panel. 31 is a generation duplicating directive button, 32 is a directive display panel, 33 is a reduction/enlargement magnification directive button, 34 is a start button, and 35 is a stop button. Conventionally, for example in the operation panel of a color copier, various instructions are given, a directive display panel 32 (for example, a liquid crystal display board) is provided for displaying various information, and various buttons, such as a reduction/enlargement magnification directive button 33, a start button 34, and a stop button 35, and an LED or the like are arranged. The directive of each type of original document mode, for example as shown in the upper portion of FIG. 8, is formed by displaying and selecting the original document mode and the like on the directive display panel 32. For example, in FIG. 8, the printed photograph mode is selected as the original document mode. When the user, for example, designates the character mode, the image processing parameter detector 11 detects this and transmits the original document mode directive TAG signal which designates the character mode to each image processing module, and also indicates each type of parameter setting corresponding to the character mode to the image processing parameter storage unit 5, and the operation in each image processing module is converted to character mode.

The operation panel shown in FIG. 8 provides a generation duplicating directive button 31. When generation duplicating, the user should operate this generation duplicating directive button 31 to indicate generation duplicating. At such a time, the original document mode in the case of a duplicate original document is designated in the directive display panel 32. When the image processing parameter detector 11 detects the operating condition of generation duplicating directive button 31, the detector 11 designates the generation duplicating mode. Then the generation duplicating mode corresponding to the set original document mode is set, the original document mode directive TAG signal is sent to each image processing module along with an indication of each type of parameter setting corresponding to the set generation duplicating mode to the image processing parameter storage unit 5, and the operation in each image processing module is converted to the generation duplicating which has been set.

Figure 9:
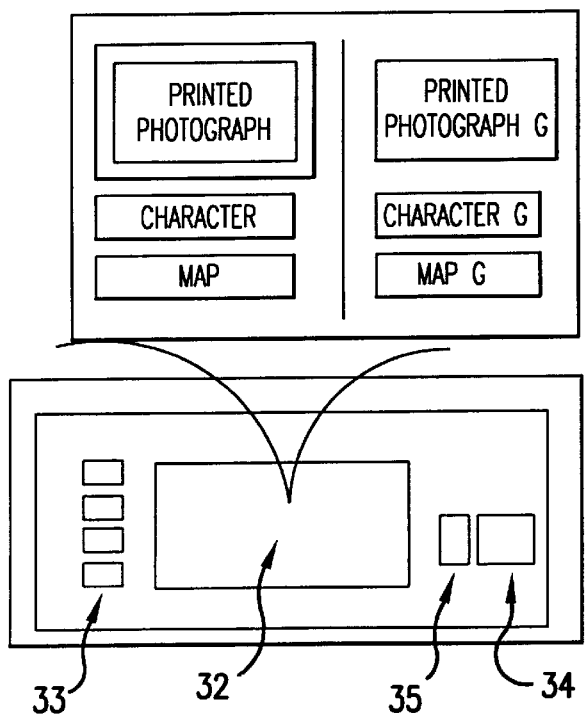
FIG. 9 shows another embodiment of an operation panel of the present invention.

FIG. 9 shows another example of the operation panel. This example shows the buttons for setting the generation duplicating mode corresponding to each original document mode on the display surface of the directive display panel 32. By the provision of a button for each generation duplicating mode, the user is able to select the desired generation duplicating mode in one single operation. Furthermore, during generation duplicating, the original document mode setting is not forgotten.

As shown in FIG. 2, for an original document which is divided into partial areas that each have an original document mode, the structure can be such that in the same manner as during duplicating, the areas and the original mode are consecutively designated using a partial area directive means of the edit panel or the like (not shown).

By thus detecting special types of duplicate original documents, it is possible to perform good image reproduction processing suitable for generation duplicating. When it is difficult to specify each type of the above mentioned generation duplicating modes, it is acceptable to set the printed photograph G mode or the like as the representative mode, for example, for processing in generation duplicating, and process by the printed photograph G mode during generation duplicating. In this case, the number of modes during generation duplicating is decreased and designing can be simplified, and there is also efficacy in terms of scale reduction of control software and display use software and the simplification of user operations. Even in such an implementation, since the characteristics of the assumed ink, paper, and so forth are known, the gradation characteristic, the color conversion characteristic, and the spatial filter characteristic can be assumed to some extent, so the above mentioned effects are obtainable during generation duplicating of most portions.

As another example of a method of detecting the existence of specified types of original documents in the image processing parameter detector 11, during the pre-scan generally performed in the color copier operation, pattern data within the original document is detected, and based on the data, the generation duplicating operation mode can be set. By this type of formation, the procedure of a button operation by the user is eliminated. Thus, it is an effective means.

When duplicating with a color copier, as a measure to prevent a spurious copy, the copy data is patterned during duplicating, and printed with a subtle toner (for example, yellow) or the like simultaneously with duplicating. In this type of pattern data, and by the input of data such as the original document mode during duplicating and the screen direction, it is possible to decode the pattern during generation duplicating and automatically perform the original document mode setting. The original document modes in one page can be thought of as corresponding relatively easily to identical cases, and as shown in FIG. 2, when the original document mode is set in each partial area, it is acceptable to include position data as pattern data. Furthermore, it is effective to use a method of embedding, such as a bar code or the like, at, for example, the top of the page, and recognizing this as pattern data, when this is permitted as copy data.

Figure 10:
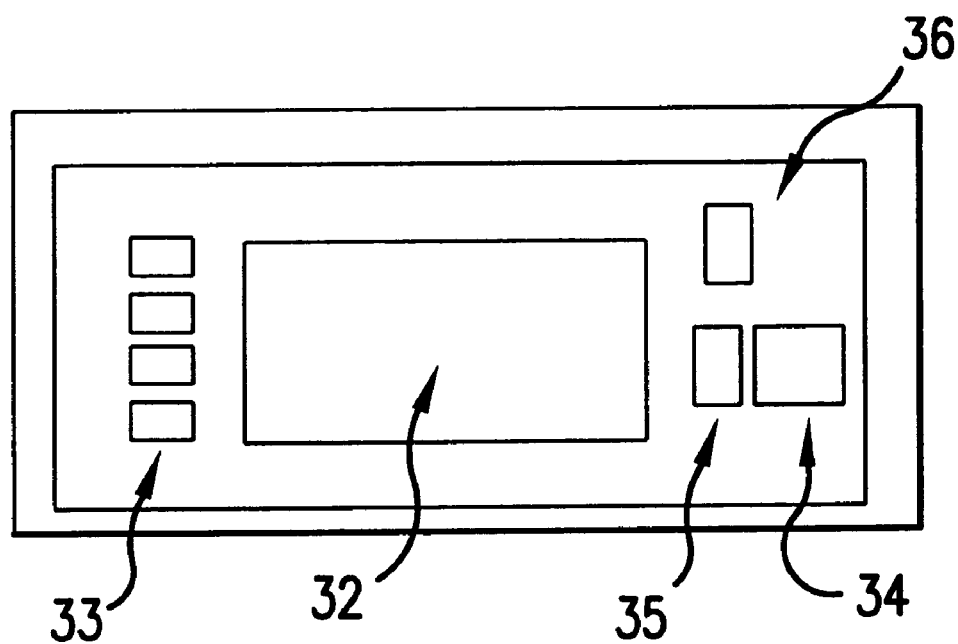
FIG. 10 shows yet another embodiment of an operation panel of the present invention.

FIG. 10 shows yet another example of the operation panel. In the diagram, 36 is a generation duplicating directive pre-scanner button. In the case of implementing automatic detection by the above mentioned pre-scanner, a structure is possible which considers whether automatic detection is desired or not based on the user's intention. For example, as shown in FIG. 10, the structure may be such that the generation duplicating directive pre-scanner button 36 and the like are arranged in the operation panel, and as long as this generation duplicating directive pre-scanner is active, recognition and detection operations are performed by the pre-scanner. It is the same even if this generation duplicating directive pre-scanner button is provided in the indicating display panel 32. When the implementation of automatic detection is not indicated by the pre-scanner, in the indication display panel 32 as shown in FIG. 9, it is also acceptable to have a function in which the user is capable of indicating the generation duplicating mode.

As is clear from the above explanation, according to this invention, generation duplicating is detected, parameters considering the generation duplicating characteristics are set in individual image processing means, and image processing is performed, making possible the effect that even in generation duplicating, a good image is output with superior color and gradation reproduction, and with little over-enhancement in sharpness.

While this invention has been described with the specific embodiments, outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A color image forming device for performing image processing on a color image by a plurality of image processing means and for outputting the color image, the device comprising:

a detection means for detecting a copy condition output from said color image forming device that an item to be copied is a duplicate original document that has been copied at least once; and a parameter storage means for storing a parameter for copying at least one duplicate original document, said parameter for use by said plurality of image processing means, wherein, when said duplicate original document is detected by said detection means, said parameter stored in said parameter storage means is set in said image processing means and said image processing is performed based on said copy condition parameter that is specified in response to said detection of said duplicate original document.

2. The color image forming device of claim 1, wherein said plurality of image processing means includes at least one of a color conversion processor, a spatial filter processor and a gradation converter.

3. The color image forming device of claim 1, wherein said detection means recognizes a specific pattern recorded during said original document formation of said duplicate original document.

4. A color image forming device for performing image processing on a color image by a plurality of image processing means and for outputting the color image, the device comprising:

a detection means for detecting that a print condition output from said color image forming device is a specified print of an original manuscript; and a parameter storage means for storing a parameter for printing said print of such original manuscript, said parameter for use by said plurality of image processing means, wherein when said print of said original manuscript is detected by said detection means, said parameter stored in said parameter storage means is set in said plurality of image processing means and said image processing is performed based on said print condition that is specified in response to said detection of said print of said original manuscript.

5. The color image forming device of claim 4, wherein said plurality of image processing means includes at least one of a color conversion processor, a spatial filter processor and a gradation converter.

6. The color image forming device of claim 4, wherein said detection means recognizes a specific pattern recorded during said original manuscript formation of said print of said original manuscript.

7. A color image forming device for performing image processing on a color image by a plurality of image processors and for outputting the color image, the device comprising:

a detector that detects a copy condition output from said color image forming device that an item to be copied is a duplicate original document that has been copied at least once; and a parameter storage that stores a parameter for copying at least one duplicate original document, said parameter for use by said plurality of image processors, wherein said parameter is set in said image processors and said image processing is performed based on said copy condition that is specified in response to said detection of said duplicate original document.

8. The color image forming device of claim 7, wherein said plurality of image processors includes at least one of a color conversion processor, a spatial filter processor and a gradation converter.

9. The color image forming device of claim 7, wherein said detector recognizes a specific pattern that is recorded during said original document formation of said duplicate original document.

10. A color image forming device for performing image processing on a color image by a plurality of image processors and for outputting the color image, the device comprising:

a detector that detects that a print condition output from said color image forming device that is a specified print of an original manuscript; and a parameter storage that stores a parameter for printing said print of said original manuscript, said parameter for use by said plurality of image processors, wherein said parameter is set in said plurality of image processors and said image processing is performed based on said print condition that is specified in response to said detection of said original manuscript.

11. The color image forming device of claim 10, wherein said plurality of image processors includes at least one of a color conversion processor, a spatial filer processor and a gradation converter.

12. The color image forming device of claim 10, wherein said detector recognizes a specific pattern recorded during said original manuscript formation of said print of said original manuscript.

* * * * *